US008875826B2

(12) United States Patent
Franzen et al.

(10) Patent No.: US 8,875,826 B2
(45) Date of Patent: Nov. 4, 2014

(54) SYSTEM FOR REPLACING A BATTERY OF A GROUND TRANSPORTATION VEHICLE, PARTICULARLY OF AN UNMANNED HEAVY-DUTY TRANSPORTATION VEHICLE FOR ISO CONTAINERS

(75) Inventors: Hermann Franzen, Mönchengladbach (DE); Armin Wieschemann, Oberhausen (DE); Mike Hegewald, Oberhausen (DE); Jannis Moutsokapas, Monheim (DE)

(73) Assignee: Terex MHPS GmbH, Düsseldorf (DE)

( * ) Notice: Subject to any disclaimer, the term of this patent is extended or adjusted under 35 U.S.C. 154(b) by 213 days.

(21) Appl. No.: 13/322,957

(22) PCT Filed: Jun. 8, 2010

(86) PCT No.: PCT/EP2010/058023
§ 371 (c)(1),
(2), (4) Date: Nov. 29, 2011

(87) PCT Pub. No.: WO2010/142688
PCT Pub. Date: Dec. 16, 2010

(65) Prior Publication Data
US 2012/0068664 A1 Mar. 22, 2012

(30) Foreign Application Priority Data

Jun. 10, 2009 (DE) .......................... 10 2009 025 052

(51) Int. Cl.
*B60K 1/00* (2006.01)
*B60R 16/04* (2006.01)
*B60L 11/18* (2006.01)
*B60L 15/38* (2006.01)
*B60S 5/06* (2006.01)
*B66F 9/06* (2006.01)

(52) U.S. Cl.
CPC .............. *B66F 9/063* (2013.01); *B60L 11/1822* (2013.01); *Y02T 90/124* (2013.01); *B60L 15/38* (2013.01); *B60S 5/06* (2013.01); *B60L 11/1877* (2013.01); *Y02T 10/7072* (2013.01); *Y02T 10/7016* (2013.01); *Y02T 10/705* (2013.01); *B60L 11/18* (2013.01); *Y02T 90/14* (2013.01); *B60L 2260/32* (2013.01); *Y02T 10/7005* (2013.01)
USPC ......................................... 180/68.5; 180/65.1

(58) Field of Classification Search
USPC ......... 180/68.5, 65.1, 65.21, 65.29, 167, 168, 180/169; 320/104, 109; 105/355, 356, 396, 105/404; 701/22–24
See application file for complete search history.

(56) References Cited

U.S. PATENT DOCUMENTS 3,799,063 A * 3/1974 Reed ............................... 104/34
4,087,895 A * 5/1978 Etienne ......................... 29/252
(Continued)

FOREIGN PATENT DOCUMENTS

DE 2359054 A1 7/1974
DE 4203778 A1 8/1992
(Continued)

OTHER PUBLICATIONS

Article entitled "Batteriewechsel leicht gennacht", in Hebezeuge and Fördermittel, Special Flurförderzeuge, Berlin 43 (2003) p. 57.
(Continued)

*Primary Examiner* — J. Allen Shriver, II
*Assistant Examiner* — James M Dolak
(74) *Attorney, Agent, or Firm* — Gardner, Linn, Burkhart & Flory, LLP

(57) ABSTRACT

The invention relates to a system for replacing a battery of a ground transportation vehicle, particularly of an unmanned heavy-duty transportation vehicle for ISO containers. The system includes storage spaces for batteries, at least one ground transportation vehicle having a receiving space for a replaceable battery, and at least one loading and unloading device for transporting batteries between the storage spaces and the receiving space of the transport vehicle in a replacement area. The storage space and the receiving space may include respective centering elements such that the battery is aligned relative to the storage space or the receiving space in response to the loading motion of the loading and unloading device.

21 Claims, 9 Drawing Sheets

(56) References Cited

U.S. PATENT DOCUMENTS

| | | | | |
|---|---|---|---|---|
| 4,397,365 | A * | 8/1983 | Harbe et al. | 180/68.5 |
| 4,450,400 | A * | 5/1984 | Gwyn | 320/109 |
| 4,496,274 | A * | 1/1985 | Pipes | 414/340 |
| 4,983,903 | A * | 1/1991 | Bae et al. | 320/128 |
| 5,187,423 | A * | 2/1993 | Marton | 320/109 |
| 5,525,884 | A * | 6/1996 | Sugiura et al. | 318/587 |
| 5,545,967 | A * | 8/1996 | Osborne et al. | 320/109 |
| 5,549,443 | A * | 8/1996 | Hammerslag | 414/809 |
| 5,585,205 | A * | 12/1996 | Kohchi | 429/99 |
| 5,612,606 | A * | 3/1997 | Guimarin et al. | 320/109 |
| 5,707,094 | A * | 1/1998 | Gower | 294/65 |
| 5,711,648 | A * | 1/1998 | Hammerslag | 414/800 |
| 5,927,938 | A * | 7/1999 | Hammerslag | 414/809 |
| 5,951,229 | A * | 9/1999 | Hammerslag | 414/398 |
| 5,998,963 | A * | 12/1999 | Aarseth | 320/109 |
| 6,014,597 | A * | 1/2000 | Kochanneck | 701/22 |
| 6,094,028 | A * | 7/2000 | Gu et al. | 320/109 |
| 6,438,453 | B1 * | 8/2002 | Kochanneck | 701/22 |
| 6,498,454 | B1 * | 12/2002 | Pinlam et al. | 320/107 |
| 7,438,144 | B2 * | 10/2008 | Chene et al. | 180/12 |
| 7,648,329 | B2 * | 1/2010 | Chilson et al. | 414/809 |
| 7,712,563 | B2 * | 5/2010 | Niebuhr | 180/68.5 |
| 7,880,436 | B2 * | 2/2011 | Fischer et al. | 320/124 |
| 7,938,612 | B2 * | 5/2011 | Springston et al. | 414/501 |
| 8,022,666 | B2 * | 9/2011 | Li | 320/109 |
| 8,146,694 | B2 * | 4/2012 | Hamidi | 180/68.5 |
| 8,201,763 | B2 * | 6/2012 | Yamada et al. | 241/101.741 |
| 8,366,371 | B2 * | 2/2013 | Maniscalco et al. | 414/279 |

FOREIGN PATENT DOCUMENTS

| | | |
|---|---|---|
| DE | 202006006539 U1 | 8/2006 |
| DE | 202007017851 U1 | 4/2008 |
| DE | 102007039778 A1 | 2/2009 |
| JP | 62205819 A | 9/1987 |
| JP | 1-159358 | 11/1989 |
| JP | 05-219606 | 8/1993 |
| JP | 5294147 A | 11/1993 |
| JP | 11-146506 | 5/1999 |
| JP | 2000-302206 | 10/2000 |
| JP | 2000302206 A | 10/2000 |
| JP | 2002-145600 | 5/2002 |
| WO | 2009032822 A1 | 3/2009 |

OTHER PUBLICATIONS

International Preliminary Examination Report (IPER) of the International Searching Authority from corresponding PCT Application No. PCT/EP2010/058023, mailed Sep. 20, 2011.

International Search Report and Written Opinion of the International Search Authority from corresponding Patent Cooperation Treaty (PCT) Application No. PCT/EP2010/058023, mailed Sep. 21, 2010.

English translation of International Search Report of the International Search Authority from corresponding Patent Cooperation Treaty (PCT) Application No. PCT/EP2010/058023, mailed Sep. 21, 2010.

* cited by examiner

SYSTEM FOR REPLACING A BATTERY OF A GROUND TRANSPORTATION VEHICLE, PARTICULARLY OF AN UNMANNED HEAVY-DUTY TRANSPORTATION VEHICLE FOR ISO CONTAINERS

BACKGROUND OF THE INVENTION

The present invention relates to systems for handling batteries of a ground transport vehicle, in particular of a heavy-duty automated guided vehicle for ISO-containers with a receiving area for a replaceable battery.

German patent DE 42 03 778 C2 discloses an automated ground vehicle having a manipulator disposed thereon. By means of the ground vehicle the manipulator can be moved automatically between different work stations, in order to perform assembly tasks at these locations. The ground vehicle is driven via a replaceable nickel-cadmium battery. The battery can be replaced automatically at a changing station if it has to be recharged. For this purpose, a vehicle frame of the ground vehicle is provided with a battery space, in which there are disposed guide rails which are oriented transversely with respect to the longitudinal direction of the ground vehicle. The underside of the battery is provided with rollers which roll in the guide rails. In order to prevent the battery from moving along the guide rails during operation of the ground vehicle, the vehicle frame is provided with a pin which is pretensioned in a resilient manner in the direction of the battery and engages into a recess in the battery during operation of the ground vehicle. In order to change the battery, the pin can be lowered hydraulically. The battery thus released can be pulled out of the vehicle frame along the guide rails by means of a changing apparatus. For the purpose of the changing operation, the ground vehicle travels automatically to a changing station. After the battery has been unlocked, a gripping device travels starting from the changing station in the direction of the battery and at that location grips a projection disposed on the outside of the battery. The gripping device then pulls the battery out of the ground vehicle and the rollers of the battery leave the guide rails of the ground vehicle and move onto travel rails of the changing station which are disposed as an extension of the guide rails. In the region of the changing station the battery is then automatically contacted and charged. The above-described first changing station is disposed opposite a second changing station, from which a reserve battery, already charged there, is pushed into the battery space from the other side. The changing time is therefore shortened so that the vehicle can be operated almost continuously with only one reserve battery.

Furthermore, German patent application DE 10 2007 039 778 A1 already discloses a heavy-duty automated guided ground vehicle for ISO-containers. The heavy-duty transport vehicle comprises a vehicle frame, on which at least one lifting platform is disposed, which can be lifted from a lowered transport position to a raised transfer position or, conversely, lowered from one to the other via at least one lifting drive. Typically, such heavy-duty transport vehicles are driven by a diesel engine.

Furthermore, from the Japanese laid-open document JP 05 294 147 A there is already known a system for changing a battery of a ground transport vehicle. Apart from the ground transport vehicles with replaceable batteries, the system includes storage areas disposed within a shelf unit for batteries to be recharged. The batteries are transported between the ground transport vehicles and the storage areas of an automated loading and unloading device. Within the transport vehicles and the shelf units the batteries are automatically coupled and uncoupled electrically.

SUMMARY OF THE INVENTION

The present invention provides an improved system for changing a battery of a ground transport vehicle, in particular a heavy-duty automated guided vehicle for ISO-containers, having storage areas for batteries, having at least one ground transport vehicle with a receiving area for a replaceable battery, and having at least one loading and unloading device for transporting the batteries between the storage areas and the receiving area of a transport vehicle standing on a changing area. Centering elements are assigned to the storage area or to the receiving area in such a way that the battery is oriented relative to the storage area or the receiving area in response to the loading movement of the loading and unloading device. In this way automated mounting and dismounting are made easier. A particular advantage is that in relation to the battery change and the orientation of the battery with respect to the receiving area or storage area, the transport vehicle or the shelf unit is designed in a passive manner and any manipulation movements start from the distribution vehicle.

According to one aspect, provision is made that the battery is formed in such a way that it can be suspended in and unhooked from the storage area or the receiving area by the loading and unloading device so that the battery is made easier to handle.

According to another aspect, support elements are disposed on the battery laterally protruding on both sides, and in the storage area carrier rails are disposed, and in the receiving area support rails are disposed, on which lie the support elements of a battery standing in the storage area or the receiving area. The batteries, the receiving area and the storage areas are therefore mechanically simple and not fitted with moveable parts.

In another aspect particularly simple attachment of the battery in the storage areas and the transport vehicle and therefore rapid mounting and dismounting may be achieved in that the battery can move in the lifting and lowering direction in order for the battery to be suspended in and unhooked from the storage areas and on the transport vehicle by the loading and unloading device.

In still another aspect, simple orientation of the battery may be achieved in that the battery is oriented via the centering elements relative to the storage area or to the receiving area in response to the lowering movement of the loading and unloading device.

In view of the heavy weight of the battery, the centering may be facilitated in that the loading and unloading device is formed in such a way that the battery can move horizontally to facilitate centering during the lowering movement of the loading and unloading device and when the centering elements are in engagement.

Thus, the system for changing the batteries is, as a whole, formed or configured in such a way that the mechanical complexity on the transport vehicles and the storage areas in the shelf unit is generally kept very low. Neither moving mechanical components such as e.g. rollers, nor active actuators such as e.g. hydraulic cylinders or electric motors are required on the storage areas or the transport vehicle. Most or substantially all necessary movements are carried out by the distribution vehicle with the loading and unloading device. Since the number of loading and unloading devices is low compared to the number of vehicles and the storage areas, the technical outlay and manufacturing costs of the system as a whole can be reduced. Furthermore, the reliability of the system may be increased by the reduced complexity.

Traction batteries known in the prior art have a clearly lower weight and dimensions than the batteries which are required for long-term operation of heavy-duty vehicles. The described system for changing the vehicle batteries may be particularly well-suited for handling and storing the large battery dimensions and heavy battery weights. The battery changing station permits rapid and automated replacement of batteries on a very compact footprint. The changing areas can be disposed flexibly with respect to the storage areas. In this way the changing station can be integrated without much planning into existing infrastructures and the design freedom during planning is increased. The rapid battery change permits environmentally friendly operation of the transport vehicles without a notable reduction in capacity.

Optionally, and means of automation, the changing station can optimally cooperate with the automated vehicles. The battery change can take place at any time regardless of the availability of personnel. In this way the system can react very well to unexpected peak loads.

In still another aspect, the handling rate may be further increased in that by means of the movement of the battery in the lifting and lowering direction, the battery can be electrically separated or electrically contacted automatically in the storage areas and transport vehicle.

From a constructional point of view it may be advantageous for the loading and unloading device to include a support arm for the battery, which, as seen in the direction of the travel path of the distribution vehicle, is able to travel laterally in and out in a mounting and dismounting direction of the storage areas and in the direction of a changing area.

The battery may be formed as a lead battery, and a charging device may be provided in the storage areas to supply the battery with a desired quantity of purified water during the charging procedure.

The system may be particularly suitable for handling batteries formed as lead batteries which have a weight of at least 6 t, preferably 8 t to 9 t.

The changing time of the batteries can further be optimised when the distribution vehicle is configured to operate in automatic mode.

A high level of availability of the transport vehicles may be achieved when a plurality of storage areas are disposed next to each other, the loading and unloading device is disposed on a distribution vehicle which can travel along the storage areas and along a travel path, and at least one changing area for the transport vehicle is disposed adjoining the travel path. By this combination of a plurality of storage areas for charging and intermediate storage of the batteries of the transport vehicles with at least one distribution vehicle for transporting the batteries to be replaced between the transport vehicles and the storage areas, it is possible to ensure that the changing of the batteries of the transport vehicles proceeds swiftly and the time of non-use of the transport vehicles does not exceed the time of non-use which is usual for a refuelling stop for diesel-fuelled transport vehicles, for example. The distribution vehicle is optimally suited to moving the batteries between the transport vehicle and the storage areas. This also means that the transport vehicles are available for use for longer.

A space-saving version of the battery changing system may be achieved when at least one changing area is disposed opposite the storage areas with respect to the travel path of the distribution vehicle. Where there is a plurality of storage areas next to each other, a distribution vehicle can then also serve a plurality of changing areas.

A further particularly space-saving version of the battery changing system may be achieved when at least one changing area is disposed adjoining the travel path and as an extension of the storage areas. The battery changing system can therefore be formed in a very slim manner as a whole.

In order to increase the mounting and dismounting capacity of the battery changing system, an extremely wide range of arrangements for the changing areas with respect to the storage areas and different numbers of distribution vehicles is also possible. More than one changing area can be provided, which is disposed opposite the storage areas in relation to the travel path and/or is disposed adjoining the travel path and as an extension of the storage areas.

A further improvement in the use of space may be achieved when the storage areas are formed in a shelf unit with a plurality of levels arranged one above the other and the distribution vehicle is formed as a shelf unit serving apparatus.

Optionally, sensors may be disposed in the region of the changing areas, with which the position of the transport vehicle relative to the loading and unloading device can be determined and the orientation of the loading and unloading device with respect to the transport vehicle on the changing area can be corrected with the aid of the determined position of the transport vehicle. It is therefore ensured that the orientation of the battery via the centering elements is effected reliably.

These and other objects, advantages and features of this invention will become apparent upon review of the following specification in conjunction with the drawings.

DESCRIPTION OF THE PREFERRED EMBODIMENTS

Figure 1:
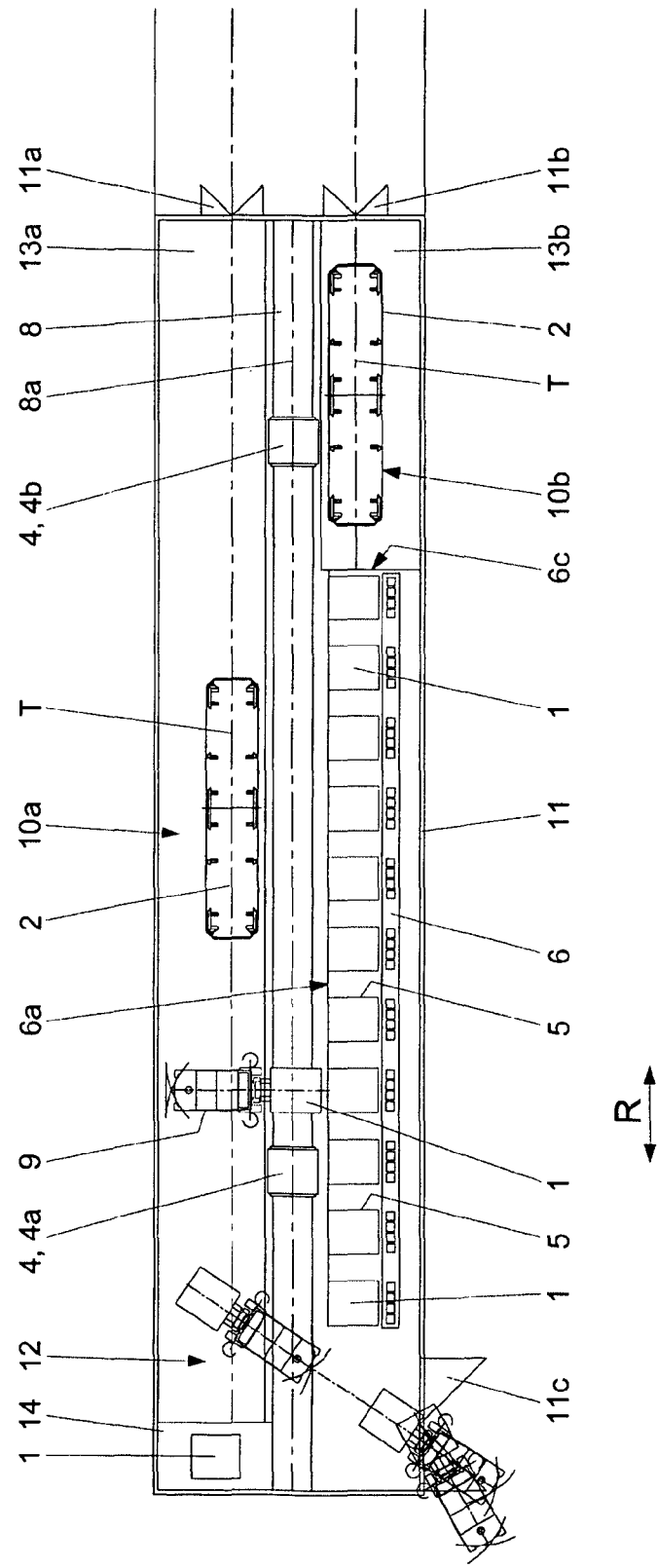
FIG. 1 is a plan view of a system for changing a battery of an automated guided ground transport vehicle for containers, in accordance with the present invention.

Referring now to the drawings and the illustrative embodiments depicted therein, a system is provided for changing a battery 1 of an automated guided ground transport vehicle 2 for containers, preferably ISO-containers (FIG. 1). The transport vehicle 2 uses the battery 1, which is preferably formed as a lead battery, as a power source for its consumers and drives, not shown. The battery 1 typically has a weight of about 6 to 10 tons (t), preferably 8 to 9 t, and permits operation of the transport vehicle 1 for about 6 to 8 hours. The battery 1 drives an electric motor, not shown, which in turn drives a hydraulic pump which acts upon the single-wheel travel drives of the transport vehicle 2, the lifting drive for a lifting platform 3 of the transport vehicle 2, and any further consumers. An electric travel drive may also be used instead of the electro-hydraulic travel drive. The transport vehicle 2 can also be formed without a lifting platform 3 for the containers. The containers are then set down directly on the transport vehicle 2 or the vehicle frame 2b thereof.

As generally described herein, a heavy-duty transport vehicle 2 is understood to be a vehicle which can transport a payload of at least 15 t, preferably at least 20 t. Loads for the heavy-duty transport vehicles include ISO-containers and swap containers. Laden swap containers can generally weigh up to about 16 t. In the laden state, ISO-containers weigh 20 t to 80 t. Transport of ISO-containers is preferred, although it will be appreciated that the system and transport vehicles may be configured for substantially any containers. ISO-containers are understood generally to be large standardised containers having standardised receiving points or corners for load receiving means. A heavy-duty transport vehicle which travels empty or transports an empty ISO-container or swap container is also to be understood in this way, as long as this vehicle can transport a payload of at least 15 t, preferably at least 20 t. It can also be the case that such heavy-duty transport vehicles operate in a mixed operation, i.e. transport not only ISO-containers or swap containers but also other loads such as semitrailers, swap trailers, trailers, heavy goods vehicles or tractor trucks.

In addition to the transport vehicle 2, the system includes a distribution vehicle 4 and a plurality of storage areas 5 for batteries 1 in a shelf unit 6. By means of the distribution vehicle 4, the almost discharged batteries 1 are unloaded from the transport vehicle 2 as required and set down on a storage area 5 of the shelf unit 6. A charged battery 1 is then supplied from a storage area 5 of the shelf unit 6 to the transport vehicle 2 by the distribution vehicle 4. For this purpose the distribution vehicle 4 has a telescopically operating loading and unloading device 7 which handles the battery 1 in the manner of a forklift truck.

In the present exemplified embodiment, a plurality of storage areas 5 are disposed linearly or side-by-side next to each other and disposed on a plurality of levels 6a one above the other in the shelf unit 6. In a corresponding manner, the shelf unit 6 has a rectangular base surface with two long sides 6b and two end faces 6c. Along one of the two long sides 6b extends a travel path 8 for the distribution vehicle 4. The travel path 8 also extends in a straight line corresponding to the linear formation of the shelf unit 6. A rail 8a is let into the travel path 8 so that the travel path 8 can be crossed easily by other vehicles. The distribution vehicle 4 travels on this rail 8a and can thus reach all the storage areas 5 of the shelf unit 6 with its loading and unloading device 7 in the manner of a shelf unit serving apparatus.

It is fundamentally also possible to form the distribution vehicle 4 in such a way that it operates only on one level 6a and therefore the storage areas 5 are disposed next to each other only on a single level 6a.

In the illustrated embodiment, a first distribution vehicle 4a and a second distribution vehicle 4b are provided in order, on the one hand, to increase the mounting and dismounting capacity of the system and, on the other hand, to retain the availability of the system in the event of a failure of one of the two distribution vehicles 4a, 4b, by means of redundancy. In the unlikely event that both distribution vehicles 4a, 4b fail, a forklift truck 9 or comparable vehicle can enter the system and the batteries 1 can be changed manually.

Furthermore, changing areas 10 are provided adjoining the travel path 8, on which changing areas a respective transport vehicle 2 for the changing of the battery 1 can be parked, such as shown in FIG. 1. Since the transport vehicles 2 are typically driverless, they travel automatically to the changing areas 10. The changing areas 10 adjoin the travel path 8 so that the loading and unloading device 7 of the distribution vehicles 4a, 4b can reach the battery 1 attached to the transport vehicle 2. As seen in relation to the travel path 8, the first changing area 10a is disposed opposite the storage areas 5 of the shelf unit 6. The transport vehicle 2 standing on the first changing area 10a is oriented in this case with its longitudinal direction T in parallel with the longitudinal extension R of the shelf unit 6. This inevitably means that the rail 8a of the distribution vehicle 4 is also oriented in parallel with the longitudinal direction T of the transport vehicle 2 and the longitudinal extension R of the shelf unit 6.

The second changing area 10b on the one hand adjoins the end face 6c of the shelf unit 6 and on the other hand adjoins the travel path 8. In this case also, the longitudinal direction T of the transport vehicle 2 is oriented essentially in parallel with the longitudinal extension R of the shelf unit 6 when the transport vehicle 2 is standing on the second changing area 10b. In relation to the second changing area 10b, the distribution vehicle 4 can be formed in such a way that the loading and unloading device 7 can travel out in only one direction, since the storage areas 5 of the shelf unit 6 and the second changing area 10b lie on the same side of the distribution vehicle 4.

In relation to the first changing area 10a, which lies opposite the storage areas 5 in relation to the distribution vehicle 4, the loading and unloading device 7 is formed in a corresponding manner such that it can travel in and out to both sides in order to be able to handle the batteries 1 during the changing procedure.

The distribution vehicles 4 operate in automatic mode in precisely the same way as the automated guided vehicles 2 operate in the automatic mode. In a corresponding manner, the system's whole changing zone 12 is surrounded by a boundary 11, which can be formed as a fence or wall, in order to limit or prevent unauthorised access and therefore risk to persons. In order to permit the transport vehicles 2 to travel into the changing zone 12 surrounded by the boundary 11, a first gate 11a is provided in the boundary 11 as an extension of the first changing area 10a, a second gate 11b is provided in the boundary 11 as an extension of the second changing area 10b, which gates each open and close automatically in order thereby to allow a transport vehicle 2 to travel in and out. Furthermore, a third gate 11c is provided in order to be able to travel to or walk on the changing zone 12 for maintenance purposes or in the event of a change-over to manual operation if the distribution vehicles 4 fail. In particular, the above-described forklift truck 9 can travel in through the third gate 11c. The changing areas 10a, 10b are connected via corresponding first and second changing travel paths 13a, 13b to the first and second gate 11a and 11b. The changing travel paths 13a, 13b are also typically straight.

Optionally, sensors are provided in the region of the changing areas 10a, 10b in order to fix or determine the position of the transport vehicle 2 relative to the loading and unloading device. With the aid of the determined position of the transport vehicle, the orientation of the loading and unloading device may then be corrected as appropriate.

A type of workshop area 14 can also be provided in the edge region of the boundary 11 and also adjoins the travel path 8 of the distribution vehicle 4, in which batteries 1 can be set down and picked up by the distribution vehicle 4 in order for them to be maintained, replaced or repaired there.

It will be appreciated that the system of FIG. 1 is just one of many possible embodiments of a system for changing a battery 1 of a transport vehicle 2. It is fundamentally also possible, apart from the single-line embodiment of the shelf unit 6, to provide a two-line embodiment with a travel path 8 for the distribution vehicle 4 lying therebetween. The changing areas 10 would then each be provided at the end face on one or both ends of the rows of the shelf units 6. The first or second changing area 10a, 10b could also be omitted in the described embodiment. In the case of a two-line embodiment of the shelf unit two travel paths 8 for two distribution vehicles 4 could also be provided. This would then be comparable with doubling the above-described system with only the second changing area 10b. It would also be possible, in addition to the changing travel paths 13a, 13b, to allow the normal travel lanes for the transport vehicles 2 to extend in parallel during the cargo handling operation so that the transport vehicles 2 enter in the manner of a lateral parking procedure in order to travel into the changing areas 10. In this embodiment a plurality of changing areas 10 would then be provided one behind the other along the travel path 8 for the distribution vehicle 4.

Figure 2:
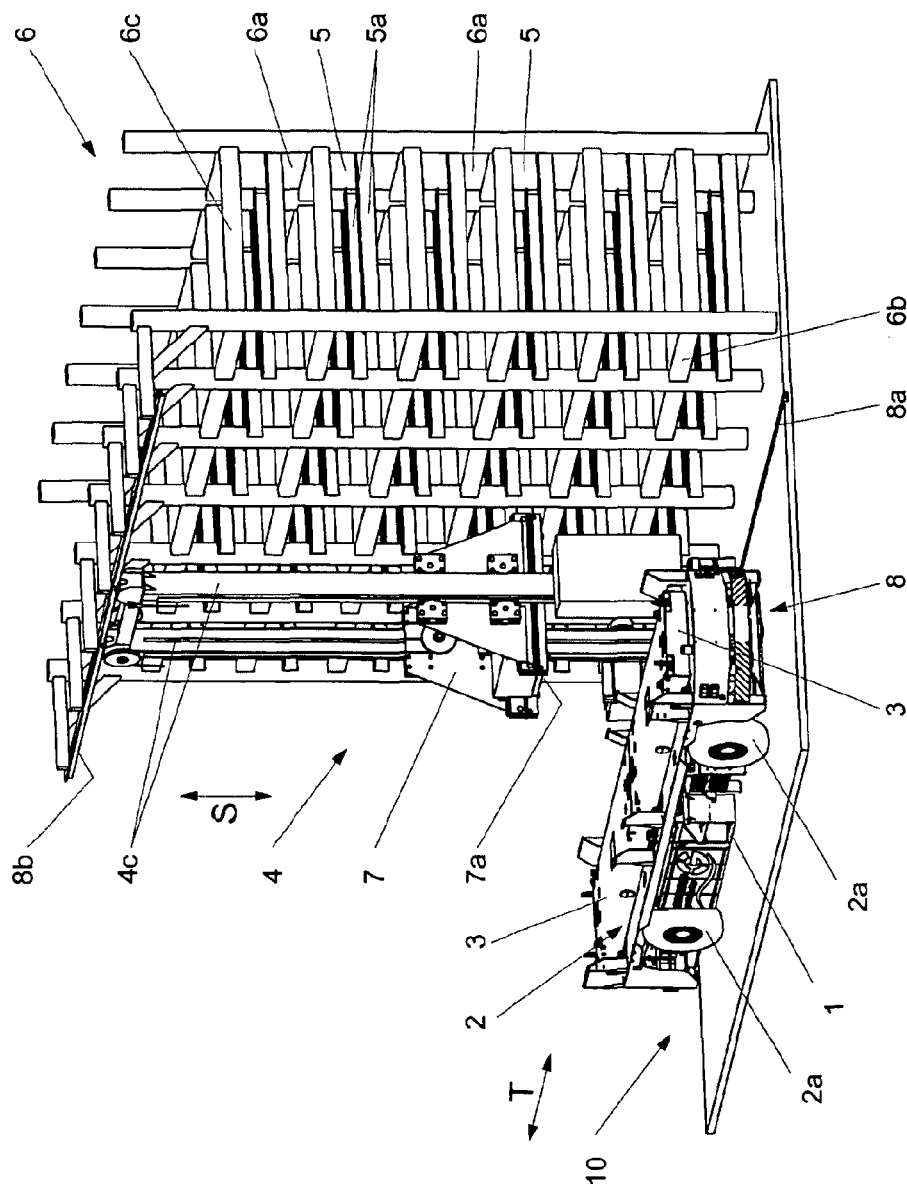
FIG. 2 is a perspective view of the system of FIG. 1.

In FIG. 2, a shelf unit 6 is shown with a distribution vehicle 4 and a transport vehicle 2 standing in front of it in a changing area 10. The shelf unit 6 is conventionally produced as a steel construction and, in the illustrated embodiment, has six storage areas 5 next to each other and also six shelf unit levels 6a one above the other. The shelf unit 6 therefore offers storage space for 36 batteries 1. The individual storage areas 5 have no storage base but are essentially made of two lateral, mutually spaced and opposing carrier rails 5a which, as seen in the vertical direction, which are attached to the steel construction of the shelf unit 6 slightly above the middle of each storage area 5. These carrier rails 5a serve to receive the batteries 1 which correspondingly have complementarily designed support elements 1a.

Figure 9:
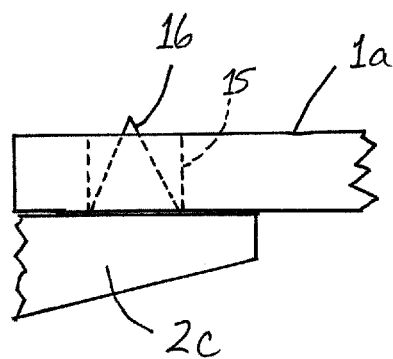
FIG. 9 is an enlarged view of the area designated IX in FIG. 8.
Figure 10:
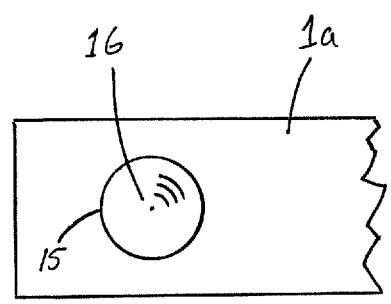
FIG. 10 is a top plan view of the area shown in FIG. 9.

As seen in plan view, the battery 1 is rectangular and the support elements 1a are disposed in the regions of the corners of the long sides of the battery 1 and each have a square shape as seen from above. In the region of the carrier rails 5a, centering elements are also provided which, as the battery 1 is lowered into the respective storage area 5, effect centering of the support elements 1a in relation to the storage area during lowering of the battery 1 relative to the carrier rails 5a. The battery can therefore be set down by the distribution vehicle in a relatively precisely positioned manner in the storage areas 5. The centering elements, are correspondingly formed in the manner of a hopper as seen in the lifting and lowering direction of the battery 1. In a preferred embodiment, a respective bore 15 is provided centrally in the support elements 1a and the centering elements are formed as vertically oriented pins 16 which taper conically upwards starting from the carrier rail 5a, as best shown in FIGS. 9 and 10. Furthermore, it is thus possible, by means of the set-down movement effected within the storage area 5, to automatically contact the battery 1 electrically via elements disposed externally on the battery 1 and, additionally, to connect it to a supply line for automatic supply of purified water in an optimum or desired quantity, and to an air connection in order to circulate the battery fluid during the charging procedure. Furthermore, the connecting and contact elements are formed in such a way that they offer an additional tolerance compensation in all movement directions. The connecting and contact elements are not shown in the shelf unit 6 for the sake of simplicity. The same also applies for the whole power supply for the actual charging procedure of the battery 1.

The distribution vehicle 4 can travel along the front long side 6b of the shelf unit 6 along its travel path 8 and the rail 8a let into the travel path 8. The distribution vehicle 4 formed as a shelf unit serving apparatus usually has two mutually spaced vertical masts 4c for the handling of heavy loads, such as the batteries 1 in this case, between which masts a lifting table 7a of the loading and unloading device 7 can travel along the masts 4c vertically in a lifting and lowering direction S. Since the transport vehicle 2 can travel along the rail 8a and the lifting table 7a along the masts 4c, each storage area 5 within the shelf unit 6 can be approached by the distribution vehicle 4.

Furthermore, it is clear with reference to FIG. 2 that the distribution vehicle 4 is additionally guided at the upper end of the two masts 4c in an upper guide rail 8b, which extends in parallel with the rail 8a in the travel path 8 and is attached to the shelf unit 6 in a cantilevered manner. The distribution vehicle 4 typically has electrical drives.

Transport vehicle 2 typically has an unladen weight of about 35 tonnes (FIG. 2). To this is added the weight of the container to be transported, not shown, so that in the laden state the weight comes to about 85 tonnes. The transport vehicle 2 is conventionally designed with four wheels 2a with tyres, which are driven via individual hydraulic or electrical drives, not shown. It can be seen that the battery 1 is disposed below a vehicle frame 2d between the front and the rear wheels 2a of the transport vehicle 2. Furthermore, two lifting platforms 3, which are disposed one behind the other as seen in the longitudinal direction T of the transport vehicle 2, are disposed on the vehicle frame 2b (FIG. 2), which lifting platforms can each receive a 20 foot container or jointly receive a 40 foot container or a 45 foot container. For the receiving or transfer procedure, the lifting platforms 3 are then conventionally lifted or lowered together or individually depending on the container concerned.

Figure 3:
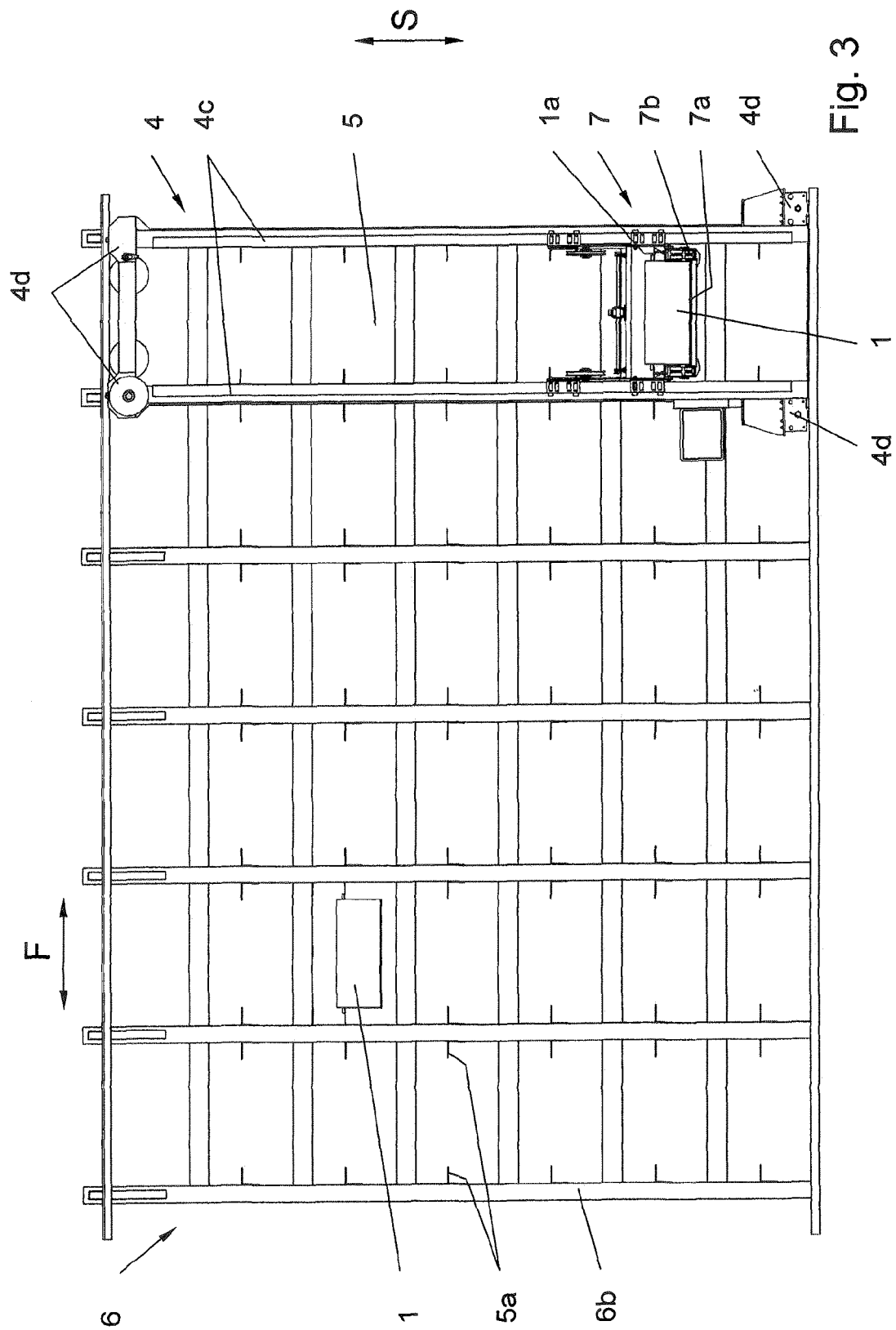
FIG. 3 is a front elevation of the shelf unit of FIG. 1.

Referring now to FIG. 3, the cuboidal shape of the storage areas 5 is readily apparent. Storage areas 5 are disposed in rows and columns in order to receive batteries 1, which are essentially also cuboidal, for the charging procedure and therefore for a type of intermediate storage. Carrier rails 5a are provided in each storage area 5 and extend essentially horizontally and extend from the sides of the storage area 5 slightly in the direction of the inside of the storage area 5 (FIG. 2). These carrier rails 5a form a continuous support surface for the support elements 1a of the batteries 1. The battery 1 is therefore suspended inside the storage areas 5. This type of attachment also makes possible the simple automatic coupling and uncoupling of the batteries 1 for the charging procedure. Within the distribution vehicle 4 the battery is not suspended on its suspension elements 1a, but lies with its base 1b on the lifting table 7a. In order that the battery 1 can be mounted or dismounted in the storage areas 5 and can also be mounted or dismounted in the transport vehicle 2, the lifting table 7a can travel out laterally, as seen in the travel direction F of the distribution vehicle 4, transversely with respect thereto in the mounting and dismounting direction E, via support arms 7b, intermediate arms 7c and guide arms 7d, which together form a fully extending telescopic unit.

Furthermore, the distribution vehicle 4 travels via running gears 4d on the rail 8a and is guided at the top on the guide rail 8d via further running gears 4d.

Figure 4:
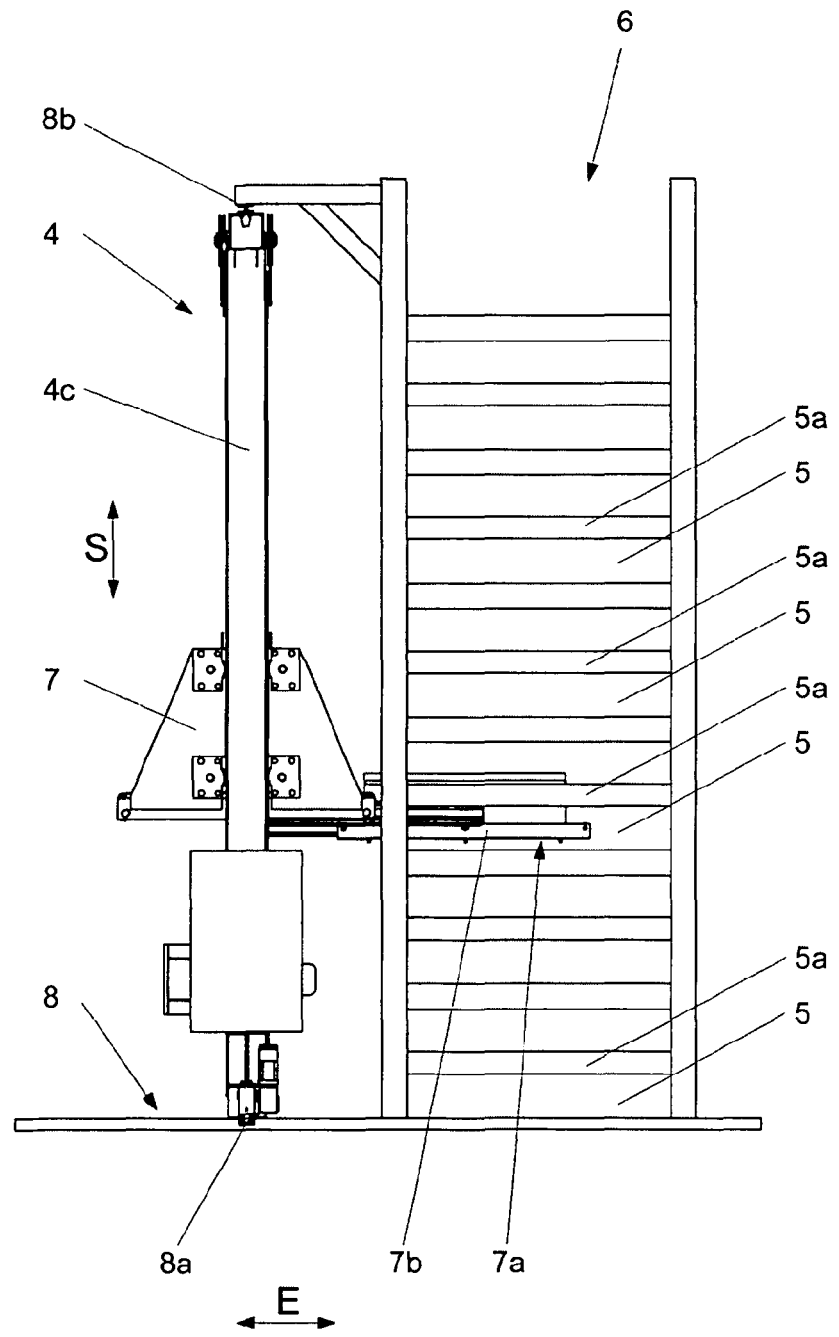
FIG. 4 is a side elevation of the shelf unit of FIG. 3.

The carrier rails 5a for the storage of the batteries alternate with steel construction elements of the shelf unit as seen in the lifting and lowering direction S (FIG. 4). In FIG. 4, the distribution vehicle 4 is shown mounting a battery 1 in a storage area of the second shelf unit level 6a as seen from below. For the set-down procedure within the shelf unit, the support arms 7b and the intermediate arms 7c are to be extended somewhat further so that the battery 1 is located completely within the storage area 5 and the intended position within the storage area 5 is reached in order to achieve automatic contacting of the battery 1 for the charging procedure. Lowering and lifting within the storage area 5 are effected via the vertical travel movement of the loading and unloading device 7 along the masts 4c of the distribution vehicle 4.

Figure 5:
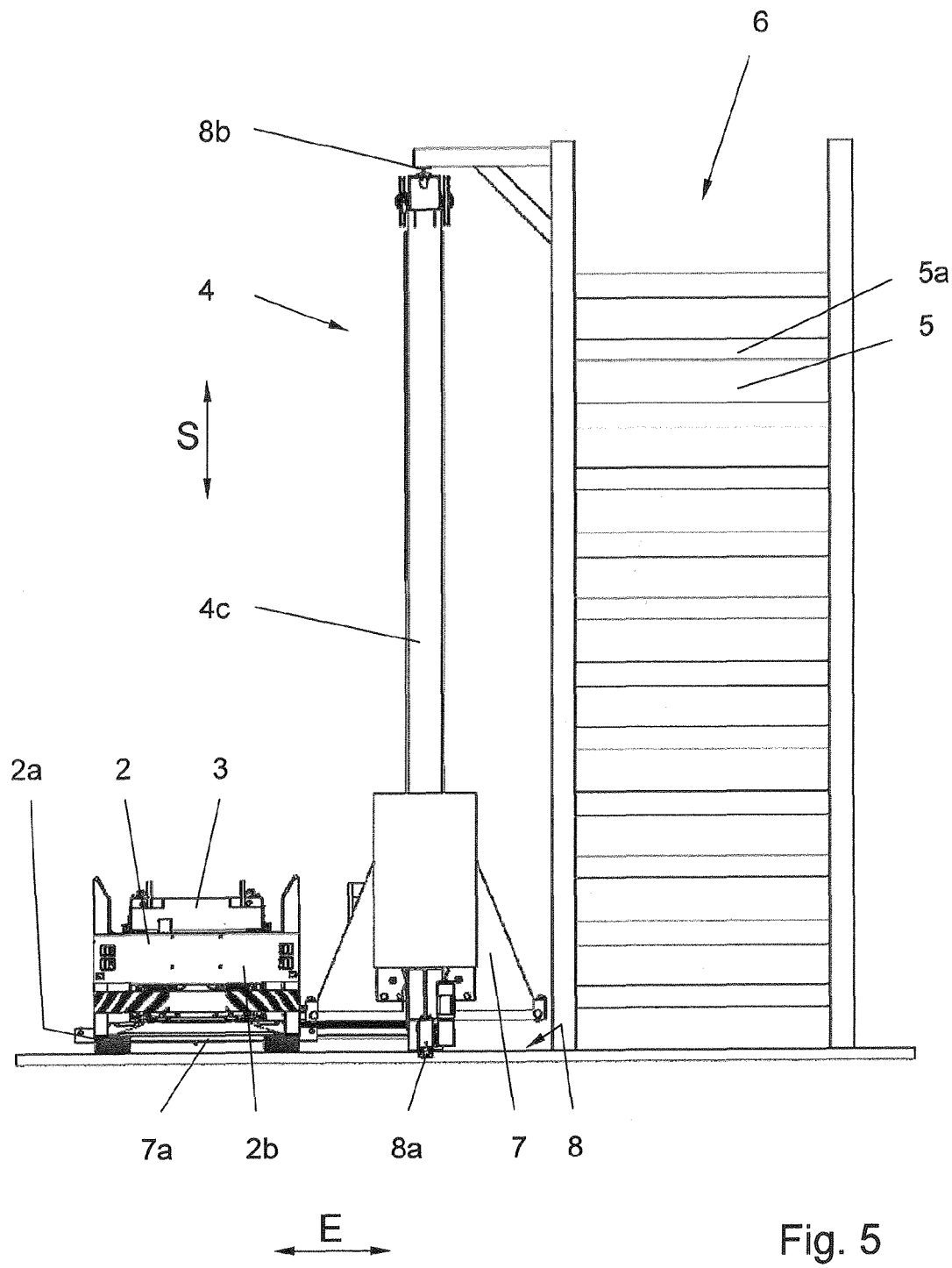
FIG. 5 is another side elevation of the shelf unit of FIG. 3 with the distribution vehicle shown in a different position.

Referring now to FIG. 5, the loading and unloading device 7 is shown in an almost completely lowered condition. Furthermore, the loading and unloading device 7 or its lifting table 7a is extended via the support arms 7b, the intermediate arms 7c and the guide arms 7d, which together form a telescopic unit, completely in the mounting and dismounting direction E, and is therefore located below the battery 1 suspended in the vehicle 2. The loading and unloading device 7 is then lifted in the lifting and lowering direction S along the masts 4c and the battery 1 is therefore lifted out of the anchoring in the transport vehicle 2. In the transport vehicle 2 are the support rails 2c which correspond essentially to the carrier rails 5a of the storage areas 5. It is important in this case that the electrical contacting of the battery 1 with the transport vehicle 2 or the mutual separation thereof takes place automatically only by the lifting and lowering movement of the distribution vehicle 4. When the battery 1 is then standing on the lifting table 7a and the support elements 1a of the battery 1 are separated from the support rails 2c of the transport vehicle 2, the lifting table 7a travels in the mounting and dismounting direction E in the direction of the loading and unloading device 7 until the battery 1 is oriented more or less symmetrically to the masts 4c.

Optionally, the changing area 10 on which the transport vehicle 2 is standing may be disposed precisely opposite to an empty storage area 5 so that the loading and unloading device 7 can move the flat battery 1 directly on the opposite side of the changing area 10 in the mounting and dismounting direction E in the storage area 5. At that location the loading and unloading device 7 lowers, and thereby contacts, the battery 1 and then leaves the storage area 5. However, the distribution vehicle 4 will then conventionally move the battery 1 to an empty storage area 5, then receive a charged battery 1 and supply it to the waiting transport vehicle 2 which has no battery 1.

Figure 6:
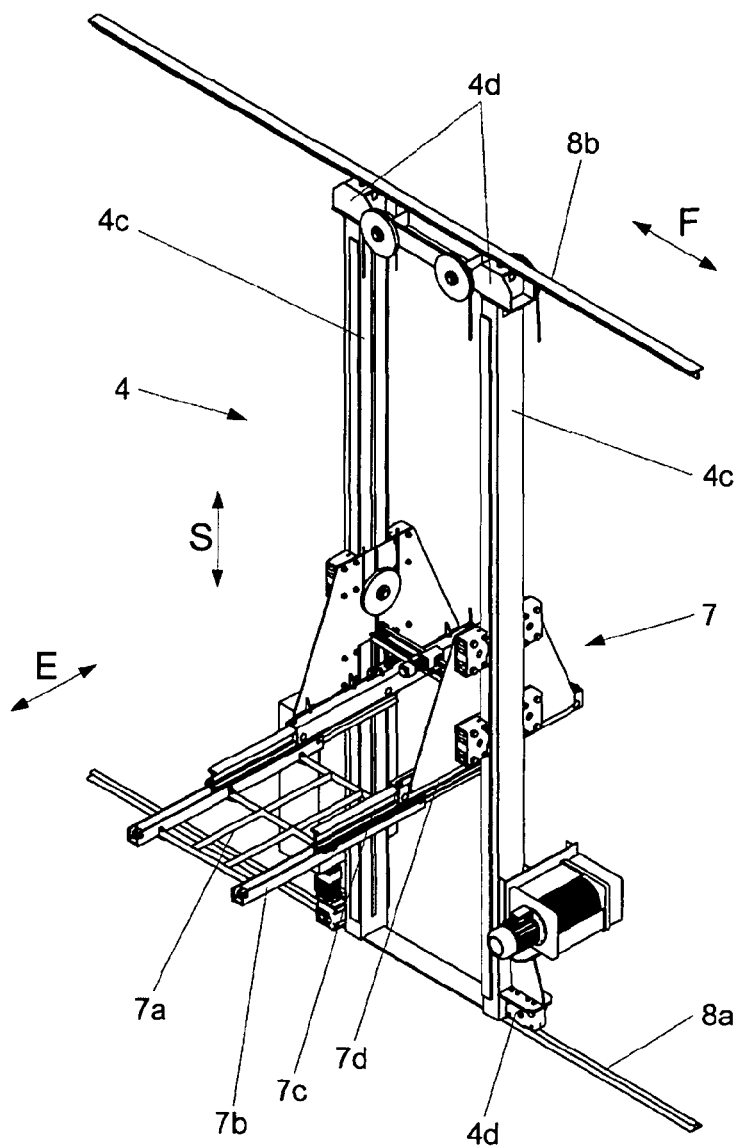
FIG. 6 is a perspective view of one of the distribution vehicles from the system of FIG. 1.

In addition to the upper guide rail 8b and the lower rails 8a, the structure of the loading and unloading device 7 is particularly evident with reference to FIG. 6. The loading and unloading device 7 includes the lifting table 7a, which in this case is formed in a grid-like manner and serves to receive the base 1b of the battery 1. The lifting table 7a is disposed between two support arms 7b formed as longitudinal carriers. These support arms 7b are suspended on guide arms 7d via further intermediate arms 7c. The guide arms 7d are fixed in relation to the masts 4c and the intermediate arms 7c are displaceable along the guide arms 7d in the mounting and dismounting direction E, and the support arms 7b are also displaceable on the intermediate arms 7c. The lifting table 7a can therefore be extended in a telescopic manner completely out of the contour of the distribution vehicle 4 in the mounting and dismounting direction E laterally to the left or right. The desired mounting and dismounting of the batteries 1 in the storage areas 5 or the mounting and dismounting of the batteries 1 in the transport vehicle 2 are therefore possible.

Furthermore the loading and unloading device 7 is formed in such a way that the battery 1 can move horizontally in order to facilitate centering during the lowering movement of the loading and unloading device 7 and when the centering elements are in engagement. This can be achieved in a constructional embodiment in that a roller table is disposed on the lifting table 7a and is released when centering elements are at least initially in engagement, and therefore renders possible the desired horizontal compensation movement of the battery 1 during the centering procedure even though the battery has such a high total weight. Alternatively, the horizontal movement axes of the loading and unloading device 7 can be switched powerlessly.

Figure 7:
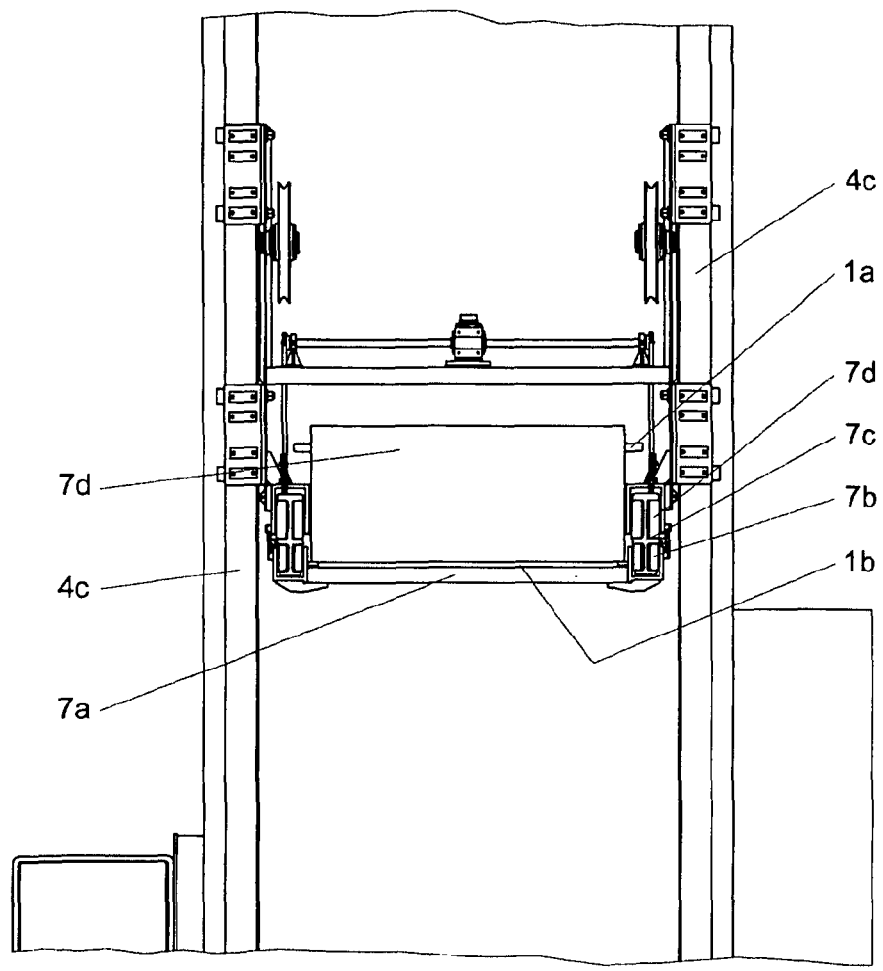
FIG. 7 is an enlarged front elevation of a portion of FIG. 3 in the region of the distribution vehicle.

In addition to the above-described lifting table 7a the support arms 7b are also shown, which are directly connected to the lifting table 7a, such as shown in FIG. 7. The intermediate arms 7c and the guide arms 7d, which together with the support arms 7b form a type of fully extending telescopic unit, are disposed above the support arms 7b as seen in the lifting and lowering direction S.

Furthermore, in relation to the battery 1, the bracket-like suspension elements 1a, which are cantilevered laterally, are shown particularly clearly in FIG. 7.

Figure 8:
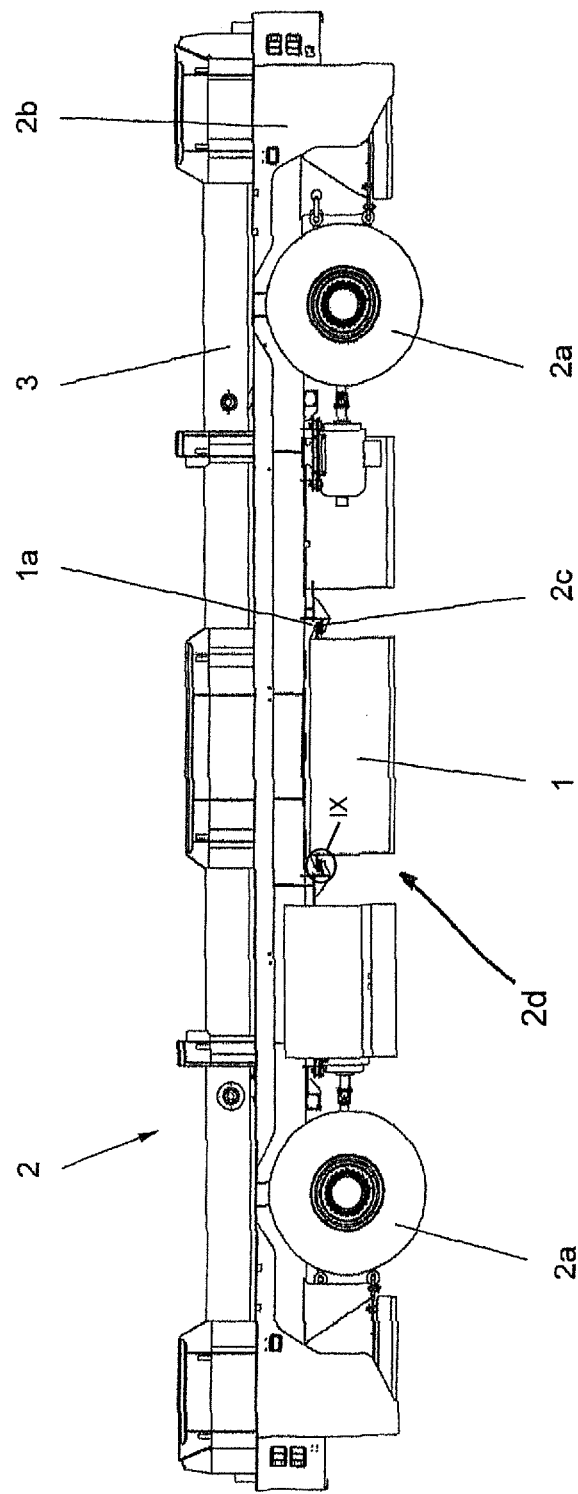
FIG. 8 is a side elevation of the transport vehicle in FIG. 3.

Referring now to FIG. 8, the battery 1 is shown disposed between the front and the rear wheels 2a in a receiving area 2b and is suspended via support rails 2c on the vehicle frame 2b of the transport vehicle 2. The two support rails 2c are oriented horizontally and spaced apart from each other and are attached at a certain level to the vehicle frame 2b. In order to permit this suspension, the battery 1 has, as described above, suspension elements 1a which are cantilevered laterally and lie on the support rails 2c of the transport vehicle 2 when the battery 1 is in the operating condition. By suspending the battery 1 in this manner within the vehicle frame 2b and in the upper region of the battery, a forklift truck or the lifting table 7a of the loading and unloading device 7 can easily travel under the battery 1, the battery 1 can be lifted in the lifting and lowering direction S for automatic unlocking and decontacting from the transport vehicle 2, and the battery can then be moved out of the transport vehicle 2 in the mounting and dismounting direction E.

In the region of the support rails 2c, centering elements are also provided as in the case of the carrier rails 5a, which centering elements effect centering of the support elements 1a in relation to the receiving area 2d during lowering of the battery 1 into the respective receiving area 2d. Therefore, the battery 1 can be set down in a relatively precise position in the storage area 5 by the distribution vehicle 4. The centering elements are correspondingly formed in a hopper-like manner as seen in the lifting and lowering direction of the battery 1. In a preferred embodiment, a respective bore is provided centrally in the support elements 1a and the centering elements are formed as vertically oriented pins 16 which taper in a conical manner upwards starting from the support rail 2c.

The intended fields of application for the transport vehicles described above and the associated battery-change systems are typically for ISO-container handling in docklands and in intermodal traffic between road and rail.

The present invention has been described with reference to a ground transport vehicle for the transportation of containers. In principle, it is possible also to transport other heavy loads, such as e.g. slabs or coils, in metallurgical engineering, steel engineering and rolling mill engineering, for example.

Changes and modifications to the specifically described embodiments may be carried out without departing from the principles of the present invention, which is intended to be limited only by the scope of the appended claims as interpreted according to the principles of patent law including the doctrine of equivalents.

The invention claimed is:

1. A battery changing system for use in changing a battery of a ground transport vehicle, said system comprising:
   storage areas for batteries;
   at least one ground transport vehicle with a receiving area for a replaceable lead battery having a weight of at least 6 tons, wherein said transport vehicle is a heavy-duty automated guided vehicle for ISO-containers;

a changing area for supporting the at least one ground transport vehicle;

at least one loading and unloading device for transporting the batteries between the storage areas and the receiving area of the at least one transport vehicle supported on the changing area, wherein the loading and unloading device is configured to move the batteries in a lifting and lowering direction for mounting or dismounting the batteries in the storage areas or in the receiving area;

centering elements positioned in the storage area and the receiving area, the centering elements configured to orient the battery relative to the storage area or the receiving area in response to the lowering movement of the loading and unloading device;

support elements disposed on the battery, the support elements laterally protruding on both sides of the battery;

carrier rails disposed in the storage area;

support rails disposed in the receiving area, wherein the receiving area is open on both sides of the transport vehicle; and wherein the support elements of the battery are configured to lie on the carrier rails or the support rails when the battery is positioned in the storage area or the receiving area.

2. The system as claimed in claim 1, wherein the battery is configured to be suspended in and unhooked from the storage area or the receiving area by the loading and unloading device.

3. The system as claimed in claim 1, wherein the loading and unloading device is configured to permit the battery to move horizontally to facilitate centering during the lowering movement of the loading and unloading device and when the centering elements are in engagement with the battery.

4. The system as claimed in claim 1, wherein the battery is configured to be electrically separated or electrically contacted automatically in the storage areas and the receiving areas upon movement of the battery in the lifting and lowering directions, respectively.

5. The system as claimed in claim 1, wherein the loading and unloading device has a support arm for the battery, which is able to travel laterally in a mounting and dismounting direction in and out of the storage areas and in the direction of the changing area.

6. The system as claimed in claim 1, further comprising a distribution vehicle that is configured to operate in an automatic mode.

7. The system as claimed in claim 1, further comprising:
a plurality of the storage areas disposed next to each other;
a distribution vehicle for supporting the loading and unloading device, the distribution vehicle configured to travel along the storage areas and along a travel path; and
wherein at least one changing area for the transport vehicle is disposed adjoining the travel path.

8. The system as claimed in claim 7, wherein the at least one changing area is disposed opposite the storage areas with respect to the travel path of the distribution vehicle.

9. The system as claimed in claim 7, wherein the at least one changing area is disposed adjoining the travel path and as an extension of the storage areas.

10. The system as claimed in claim 7, comprising more than one changing area disposed opposite the storage areas with respect to the travel path or adjoining the travel path and as an extension of the storage areas.

11. The system as claimed in claim 1, wherein a shelf unit with a plurality of levels arranged one above the other comprises the storage areas, and wherein the distribution vehicle is configured as a shelf unit serving apparatus.

12. The system as claimed in claim 1, further comprising sensors disposed in the region of the changing areas, the sensors configured to determine the position of the transport vehicle relative to the loading and unloading device so that the orientation of the loading and unloading device can be corrected with respect to the transport vehicle on the changing area with the aid of the determined position of the transport vehicle.

13. The system as claimed in claim 3, wherein the battery is configured to be electrically separated or electrically contacted automatically in the storage areas and the receiving areas upon movement of the battery in the lifting and lowering directions, respectively.

14. The system as claimed in claim 13, wherein the loading and unloading device has a support arm for the battery, which is able to travel laterally in a mounting and dismounting direction in and out of the storage areas and in the direction of the changing area.

15. The system as claimed in claim 1, further comprising a distribution vehicle that is configured to operate in an automatic mode.

16. The system as claimed in claim 15, further comprising:
a plurality of the storage areas disposed next to each other;
a distribution vehicle for supporting the loading and unloading device, the distribution vehicle configured to travel along the storage areas and along a travel path; and
wherein at least one changing area for the transport vehicle is disposed adjoining the travel path.

17. The system as claimed in claim 16, wherein the at least one changing area is disposed opposite the storage areas with respect to the travel path of the distribution vehicle.

18. The system as claimed in claim 17, wherein the at least one changing area is disposed adjoining the travel path and as an extension of the storage areas.

19. The system as claimed in claim 18, comprising more than one changing area disposed opposite the storage areas with respect to the travel path or adjoining the travel path and as an extension of the storage areas.

20. The system as claimed in claim 19, wherein a shelf unit with a plurality of levels arranged one above the other comprises the storage areas, and wherein the distribution vehicle is configured as a shelf unit serving apparatus.

21. The system as claimed in claim 20, further comprising sensors disposed in the region of the changing areas, the sensors configured to determine the position of the transport vehicle relative to the loading and unloading device so that the orientation of the loading and unloading device can be corrected with respect to the transport vehicle on the changing area with the aid of the determined position of the transport vehicle.

* * * * *